United States Patent [19]

Druet

[11] Patent Number: 5,239,882
[45] Date of Patent: Aug. 31, 1993

[54] SCREW-NUT DEVICE OF ROLLING BEARING TYPE WITH ADJUSTABLE CLEARANCE OR PRELOAD

[75] Inventor: Clair M. Druet, Drumettaz Clarafond, France

[73] Assignee: Transrol, Chambery, France

[21] Appl. No.: 882,896

[22] Filed: May 14, 1992

[30] Foreign Application Priority Data

May 16, 1991 [FR] France .................... 91 05967

[51] Int. Cl.$^5$ .................... F16H 1/16; F16H 55/17
[52] U.S. Cl. .................... 74/424.8 R; 74/459; 74/424.8 NA
[58] Field of Search ........ 74/409, 424.8 R, 424.8 NA, 74/441, 459

[56] References Cited

U.S. PATENT DOCUMENTS

| | | | |
|---|---|---|---|
| 4,221,137 | 9/1980 | Futaba | 74/459 X |
| 4,542,661 | 9/1985 | Teramachi | 74/424.8 R X |
| 4,557,156 | 12/1985 | Teramachi | 74/459 |
| 4,680,982 | 7/1987 | Wilke et al. | 74/459 X |

*Primary Examiner*—Allan D. Herrmann
*Assistant Examiner*—David W. Laub
*Attorney, Agent, or Firm*—Beveridge, DeGrandi, Weilacher & Young

[57] ABSTRACT

Screw-nut device of rolling bearing type comprising a screw (V) and a nut (E) with multiple threads, of identical pitch. The consecutive threads (I, II) have, on the screw (V) and on the nut (E), intervals (a+δ, a−δ) varying in repetitive manner with a periodicity corresponding to the pitch, changing of the position of assembly of the screw (V) with respect to the nut (E) making it possible, with the same constituent elements, to cause the conditions of contact of the rolling elements (B) with the threads of the nut (E) and of the screw (V) to vary.

8 Claims, 4 Drawing Sheets

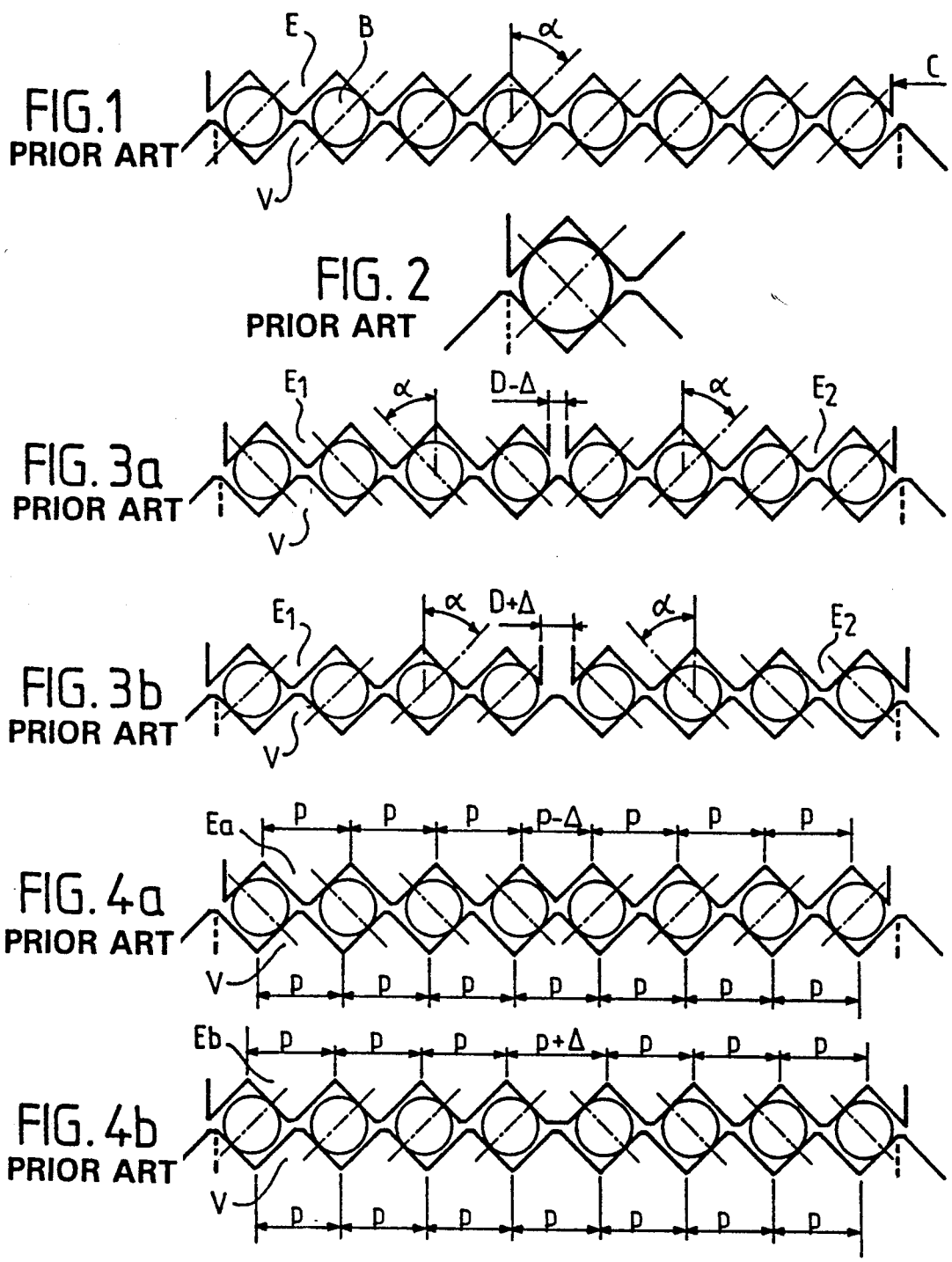

SCREW-NUT DEVICE OF ROLLING BEARING TYPE WITH ADJUSTABLE CLEARANCE OR PRELOAD

BACKGROUND OF THE INVENTION

The present invention relates to a screw-nut device comprising a screw and a nut with multiple threads of identical pitch, and rolling elements disposed between the threads of the screw and of the nut.

Screw-nut devices, whether they are of the type with circulation of balls or with satellite rollers, are used in order to convert rotation movements into translation movement and vice versa.

In a screw-nut device of the type with balls or of the type with satellite rollers, the rolling elements are in oblique contact with the sides of the helicoidal grooves or threads of the screw and of the nut, at an angle whose nominal value is generally close to 45° so as to ensure at the same time the relative centring of the screw and of the nut and the taking up of the mainly axial and occasionally radial loads.

For an assembly with clearance, the usual design is such that all of the contacts of the rolling bearing elements (balls or rollers) with the sides of threads of the screw and of the nut are made at an angle having the same orientation, for a given direction of the external axial force transmitted by the rolling elements, so as to distribute the load over a maximum of contact points.

FIG. 1 of the accompanying drawings shows the contact conditions which are established between the balls B and the threads of the nut E and of the screw V in a screw-nut device with clearance, under the effect of an axial load C. It will be recognised that here all the balls B are in contact at an angle $\alpha$ of the same value and of the same orientation with the sides of all the threads.

In order to increase the precision of such a screw-nut device, it is usual to adjust or to reduce to zero the internal clearance of the device or to produce an internal preload.

For this, several systems are currently used.

1. Monobloc nut and rolling elements of larger diameter

The use of rolling elements (balls or satellite rollers) of larger diameter enables the internal clearance to be eliminated, the rolling elements then being in contact with both sides of the threads of the screw and of the nut.

In the case of screw-nut devices with balls, the threads generally have a profile constituted by two arcs of a circle so as to maintain angles of contact of the order of 45°, and each ball is then in contact with four sides, as is shown in FIG. 2 of the accompanying drawings. The axes of rotation of the balls on themselves thereby find themselves modified in comparison with the instantaneous axes of rotation in the case of two directly opposed contacts, and this results in increased sliding phenomena, creating an increase in the friction torque. The necessary torques are then higher and more sensitive to variations in the diameter of the screw, and the life of the assembly is reduced because of internal frictions contributing to wear.

For screw-nut devices with satellite rollers, the axis of rotation of the rollers does not change, whether the assembly is preloaded or not, but the construction of rollers to the precise diameter required in order to obtain a given preload is technically and economically more difficult because rollers constitute more complex elements than balls.

2. Reduction of the pitch circle diameter of the nut, by deformation of the latter Instead of interposing the rolling elements of greater diameter, one may proceed to a reduction of the pitch circle diameter of the nut by deformation of the nut. The phenomenon is then the same as far as the modification of the axis of rotation of the balls is concerned, with in addition, for certain embodiments, the disadvantage that the track for rolling in the nut is interrupted by a slot, in order to facilitate the deformation of the nut. The points of contact with the rolling elements on either side of this discontinuity have of course the disadvantage of causing a concentration of load accelerating the phenomenon of fatigue at these points.

3. Nut formed of two sections adjustable with respect to one another

Various known systems exist using nuts formed of two sections with the capability of positioning or of adjustment of two sections with respect to one another, so that the rolling elements (balls or rollers) are in contact with different sides of the threads when one of the two sections is compared with the other.

a) By relative translation between the two sections of nut.

By adjustment of the axial distance between the two sections of nut, the latter maintaining the same relative angular position, it is possible to adjust the clearance or to create a preload.

This relative translation may be produced, for example by adjustment of the two opposite surfaces of the two sections, bearing directly against one another or onto a rigid or resilient spacer washer, by action on the outer surfaces of the two sections of nut enclosed in a housing, or by any other system of the same principle, the two sections of nut maintaining the same relative angular position during the adjustment.

b) By relative rotation between the two sections of nut.

The two sections of nut being supported axially in a fixed and opposed manner with respect to reference surfaces (outer or inner surfaces supported directly or with intermediate spacers), any angular phase displacement by rotation of one of the two sections with respect to the other amounts to bringing together or separating the opposite sides of the threads of the two sections and thus causing a result identical to that of the translation described under a).

There exist various known systems for obtaining this relative angular displacement, in a definitive or an adjustable manner, and for maintaining the relative angular position of the two sections once the adjustment has been made.

According to the two above-mentioned methods of adjustment, by translation or relative rotation of the two sections of nut, the final result is seen as a difference between the nominal pitch and the actual distance between the threads in the zone of transition between the two active parts of the threads borne by the two sections.

FIGS. 3a and 3b of the accompanying drawings show the conditions of contact of the balls B with the threads of the screw V and of the two sections of nut $E_1$ and $E_2$ in two different relative positions of these two sections of nut $E_1$ and $E_2$, namely in FIG. 3a with a distance D-$\Delta$ between the two sections of nut $E_1$, $E_2$ and in FIG. 3b with a distance $d+\Delta$ between the said sections of nut.

4. Monobloc nut with adjustment of the clearance by central phase displacement of the threads of the nut during the machining Such a design of the nut makes it possible to dispense with the additional machining operations necessary in order to produce the centring and the adjustment of positioning of the two sections of nut when these two sections are executed in two pieces, as indicated under 3), and therefore permits better concentricity while being more economical for single-thread assemblies with balls. It also retains, for single-thread assemblies with balls, the advantage of an oblique contact limited to two opposed points per ball, thus avoiding the disadvantages of the systems with four contact points per ball (friction, wear).

FIGS. 4a and 4b of the accompanying drawings show such a device comprising, associated with a single-thread screw V of pitch p, either a monobloc nut $E_a$ having a thread of pitch p, except in a central position where the gap between two consecutive threads is reduced to $p-\Delta$, as shown in FIG. 4a, or a monobloc nut $E_b$ on which, in a central position, the gap between two consecutive threads of pitch p is increased to $p+\Delta$, as shown in FIG. 4b.

Both for the devices having two separate sections of nut in accordance with 3) and for devices having two monobloc sections of nut in accordance with 4), the nut must comprise an independent circuit of balls for each of the two sections of nut, so as to avoid on the one hand a too large number of balls per circuit and on the other hand the irregularities of internal friction which would be produced at the passage of the balls, in the transition zone between the two sections, from a given angle of contact to an angle of contact of opposite direction.

Moreover, when the advance per revolution (that is to say the pitch) is large, the total length of the nut is then increased insofar as the length of each section of nut must be at least equal to the pitch (equivalent to one turn of balls). This involves technological problems for the production of monobloc nuts where rectified nuts are concerned, and becomes impossible to produce if one wishes to consider a more economical machining by tapping.

In conclusion, known screw-nut devices with balls or rollers as currently used have, when means are provided for adjustment of the conditions of contact, particularly in the case of multiple threads, disadvantages either of a functional nature or of an economical nature.

SUMMARY OF THE INVENTION

The present invention provides a simple and economical solution for producing a screw-nut device with rolling elements and with multiple threads, particularly with large advance per revolution, providing with the same constituent elements (screw, nut, rolling elements), different conditions of contact of the rolling elements with the threads of the screw and of the nut, this within reduced overall dimensions and independently of the process of finishing of the threads of the nut and of the screw, while ensuring a low internal friction torque and a reduced wear. The invention provides moreover a screwnut nut device with rolling elements making it possible to construct, with the same constituent elements, an assembly capable of having clearances or preloads of different values. Lastly, the invention provides a screwnut device with rolling elements and with multiple threads making it possible to produce an, assembly adapted in optimal manner to the loads to be borne.

The screw-nut device with rolling elements and according to the invention comprises a screw and a nut with multiple threads of identical pitch, rolling elements disposed between the threads of the screw and of the nut, and means for adjustment of the conditions of contact of the rolling elements with the threads of the screw and of the nut. According to the invention, the consecutive threads have, on the screw and on the nut, intervals varying in repetitive manner with a periodicity corresponding to the pitch of the threads, in such a manner that the changing of the position of assembly of the screw with respect to the nut makes it possible to cause the conditions of contact of the rolling elements with the threads of the screw and of the nut to vary. The main difference, with respect to known devices, therefore consists in the fact that the same arrangements provided for adjusting the conditions of contact are made simultaneously on the nut and on the screw, over the entire length of these elements.

In the simplest case, the screw and the nut have an even number of threads and the intervals between the threads have two different values repeated in alternate manner. Thus when the screw is associated with the nut so that the threads of the screw and of the nut are in phase, the same conditions of contact are obtained for all the rolling elements with the threads of the screw and of the nut. On the contrary when the nut is associated with the screw so that the threads of the screw and of the nut are dephased, opposed contacts of the rolling elements with the successive threads of the screw and of the nut are obtained.

The screw and the nut may also have an odd number of threads and the intervals between the threads may have two different values repeated in alternate manner. In this case, the conditions of contacts of the rolling elements with the successive threads of the nut and of the screw are the same when the threads are in phase and are opposed when the threads are dephased. On the contrary, because of the odd number of threads, the association of the screw with the nut with dephasing of the threads provides opposed contacts with an orientation privileged in one direction.

In both cases, depending on whether the threads are in phase or dephased, as a function of the diameter of the balls, an axial clearance or a zero clearance is obtained when the threads are in phase and a zero clearance or an internal preload is obtained when the threads are dephased.

Other conditions, concerning the number of the threads and the variation of the intervals between the threads, permit other noteworthy combinations with respect to adjustment of the clearance and of the preload as a function of the position of the screw with respect to the nut.

Referring to FIGS. 5 to 8 of the accompanying drawings, we shall describe below in greater detail several illustrative and non-limitative embodiments of a screw-nut device with balls according to the invention; in the drawings:

BRIEF DESCRIPTION OF THE DRAWINGS

FIGS. 1, 2, 3a, 3b, 4a, and 4b show prior art screw and nut thread arrangements;

Figure 5A:
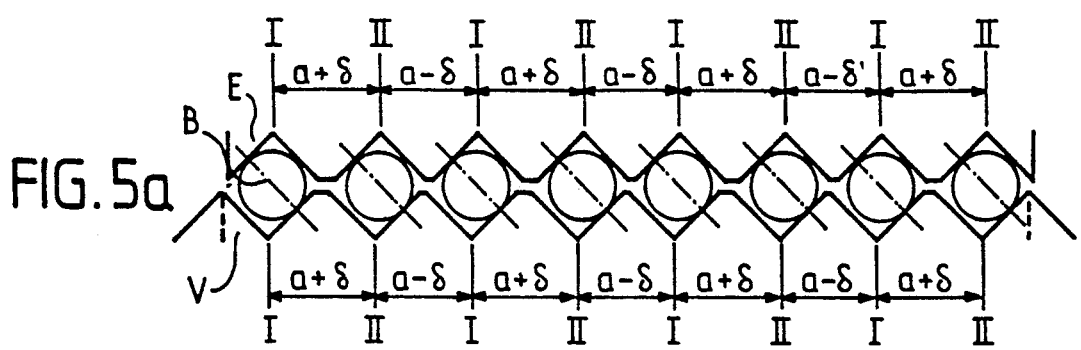
FIGS. 5a and 5b show a first embodiment of the invention, with a nut and a screw having two threads and having two values of interval between consecutive threads.
Figure 5B:
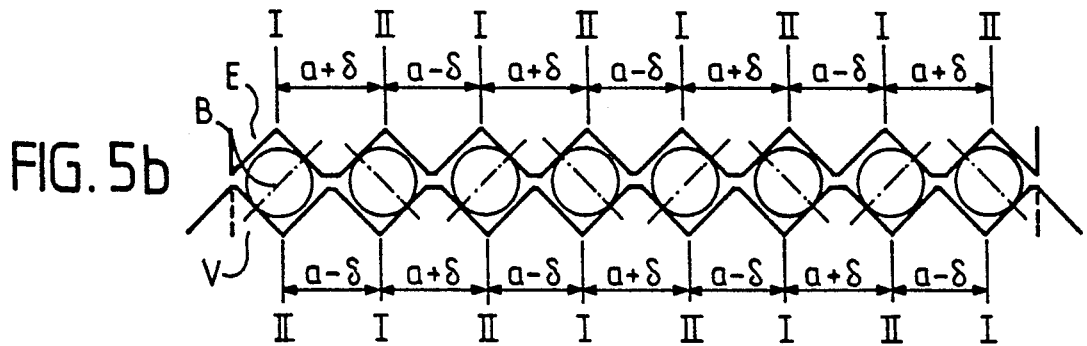

On the screw-nut system with balls according to the invention as shown in FIGS. 5a and 5b, the nut E and the screw V comprise two same threads I and II with two different values of intervals, namely $a+\delta$ between the threads I and II and $a-\delta$ between the threads II and I.

According to FIG. 5a, the screw V and the nut E are associated so that the threads having the same identification are in phase. In these conditions, all the balls B have the same conditions of contact with the threads, and this is comparable with a conventional device constructed with an equal distance between all of the threads on the screw and on the nut.

According to FIG. 5b, the threads of screw V and of the nut E are dephased, that is to say the threads I of the screw V are associated with the threads II of the nut E, and vice versa. In these conditions, the balls B have oblique contacts in opposition with the consecutive threads.

Moreover, if the diameter of the balls B is selected so as to obtain a zero clearance in the position shown in FIG. 5a, the position shown in FIG. 5b, produced with the same balls, leads to an internal preload equivalent to $-2\delta$.

Conversely, for an axial clearance of value $2\delta$ in the case of FIG. 5a, a zero clearance is obtained in the case of FIG. 5b.

A change of diameter of the balls between the position shown in FIG. 5a and the position shown in FIG. 5b makes it possible to augment the possible variants of clearance and of prestress.

Figure 6A:
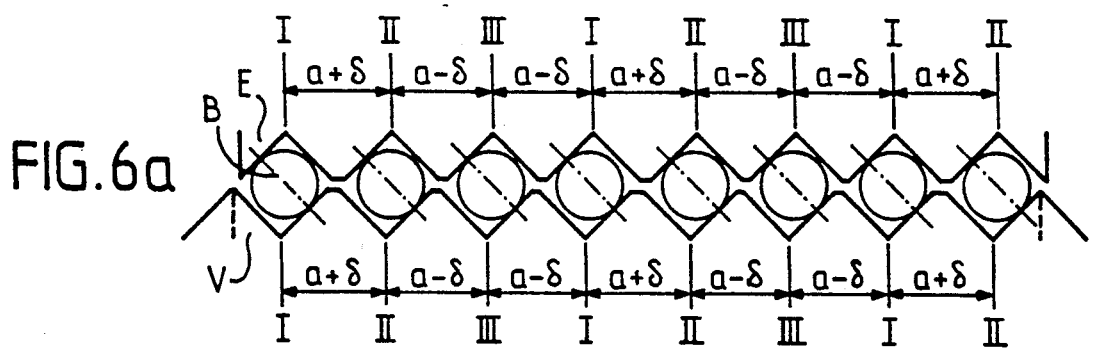
FIGS. 6a and 6b show another embodiment of the invention, with a nut and a screw having three threads and having two values of interval between threads.
Figure 6B:
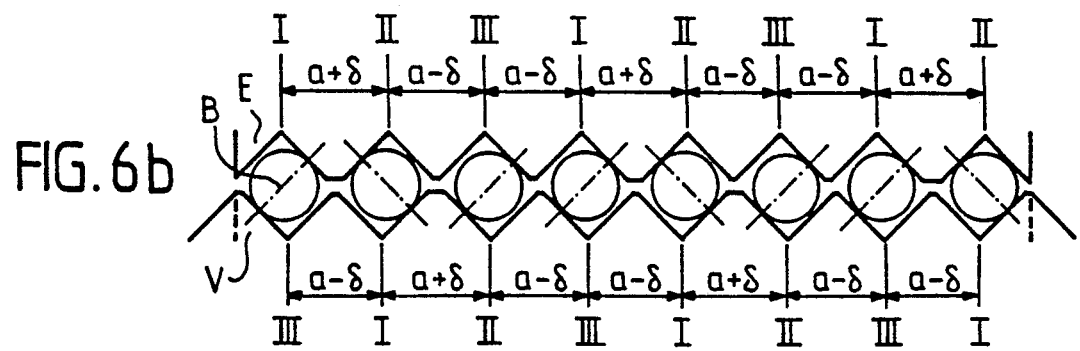

In the embodiment shown in FIGS. 6a and 6b, the screw V and the nut E have three threads with two different intervals between consecutive threads, namely $a+\delta$ between the threads I and II, $a-\delta$ between the threads II and III and $a-\delta$ between the threads III and I.

By associating the screw V with the nut E in the position shown in FIG. 6a, in which the threads of the screw are in phase with the threads of the nut, an identical contact is obtained for all the balls B, in a manner similar to FIG. 5a.

On the contrary, when the threads of the screw V and of the nut E are dephased by one thread shown in FIG. 6b, oblique contacts of alternate orientation are obtained for the balls B, with an axial preload of value $-2\delta$.

Because of the odd number of threads, a privileged orientation of the oblique contacts will be produced automatically, which may be advantageously exploited in order to make the screw-nut device bear preponderant axial loads in one direction or in the other.

According to the embodiment of FIGS. 7a to 7d, the screw-nut device comprises an even number of threads, namely four threads I, II, III, IV in the example shown, with progressive intervals a (between IV and I), $a+\delta$ (between I and II), $a+2\delta$ (between II and III) and $a+3\delta$ (between III and IV).

Figure 7A:
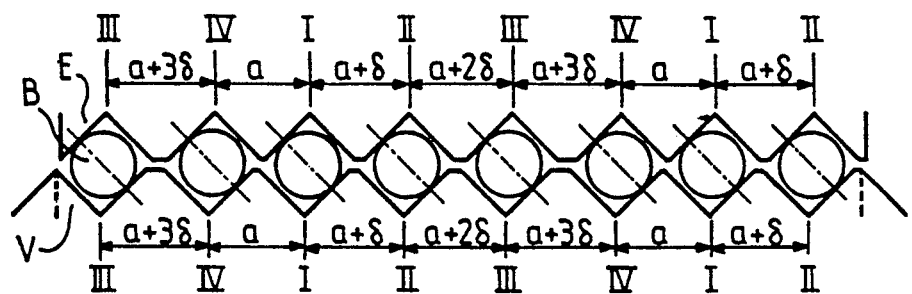
FIGS. 7a to 7d show a third embodiment of the invention, with a nut and a screw having four threads and having four progressive intervals.

When threads of the same identification of the screw V and of the nut E are in phase, as shown in FIG. 7a, oblique contacts of the same orientation are obtained for all of the balls B.

Figure 7B:
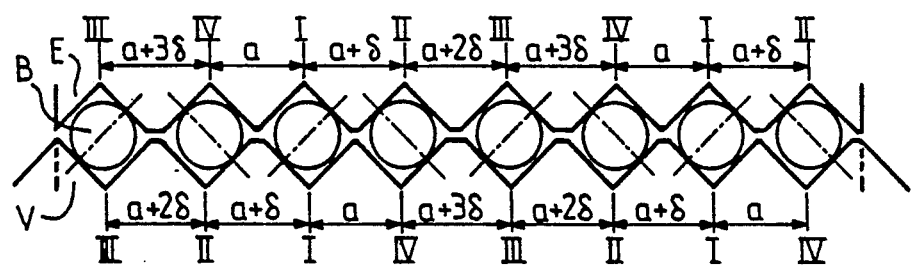

By inverting the screw V in the nut E, alternately opposed contacts are obtained, as shown in FIG. 7b, with the following dispositions:

|  |  |  |  |  |  |  |
|---|---|---|---|---|---|---|
| nut | interval between threads | a | $a+\delta$ | $a+2\delta$ | $a+3\delta$ | a |
|  | thread identification | IV | I | II | III | IV | I |
| screw | thread identification | II | I | IV | III | II | I |
|  | interval between threads | $a+\delta$ | a | $a+3\delta$ | $a+2\delta$ | $a+\delta$ |
| Difference of the intervals between nut-screw threads |  | $-\delta$ | $+\delta$ | $-\delta$ | $+\delta$ | $-\delta$ |

If, in the case of FIG. 7a, balls B have been selected so as to obtain a zero clearance, the same screws, nuts and balls rearranged as shown in FIG. 7b will lead to an axial preload of $-\delta/2$ with the same set of balls.

Figure 7C:
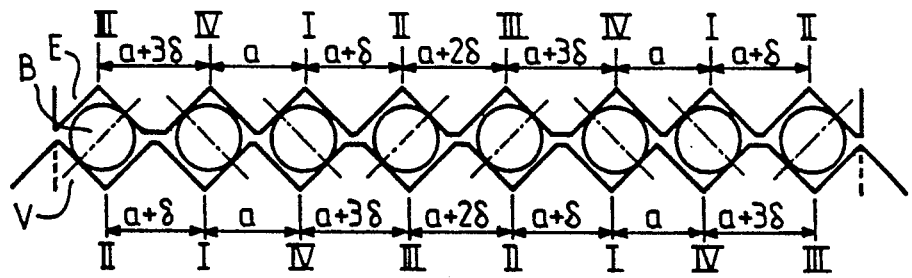

In the case of FIG. 7c, in addition to the inversion of the screw as shown in FIG. 7b, a dephasing by one thread has been performed, and this gives the following dispositions:

|  |  |  |  |  |  |  |
|---|---|---|---|---|---|---|
| nut | interval between threads | a | $a+\delta$ | $a+2\delta$ | $a+3\delta$ | a |
|  | thread identification | IV | I | II | III | IV | I |
| screw | thread identification | I | IV | III | II | I | IV |
|  | interval between threads | a | $a+3\delta$ | $a+2\delta$ | $a+\delta$ | a |
| Difference of the intervals between nut-screw threads: |  | 0 | $-2\delta$ | 0 | $+2\delta$ | 0 |
| if the differences are added cumulatively: |  | 0 | $-2\delta$ | $-2\delta$ | 0 | 0 |

Thus, by recentring the interval III-IV of the nut E with the interval 1-II of the screw, an alternation of oblique contacts opposed in pairs is obtained, with an axial preload of $-\delta$.

Figure 7D:
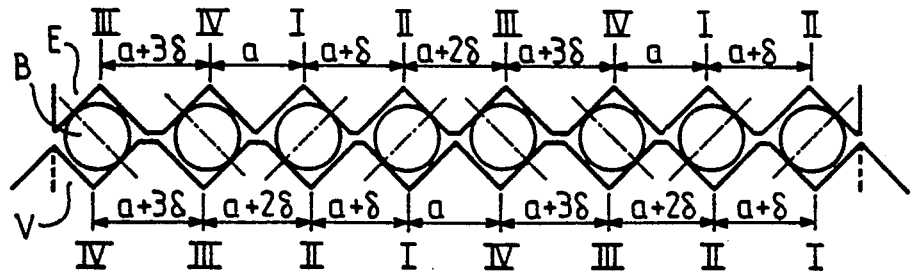

In the position shown in FIG. 7d corresponding to such an additional phase displacement that the interval II-III of the nut E is centred with the interval IV-I of the screw, contact conditions similar to those of FIG. 7c are found again, that is to say an alternation of contacts opposed in pairs.

With different sets of balls B, it is possible to obtain, with a device as shown in FIGS. 7a to 7d, the following combinations

|  | FIGS. |  |  |  |
|---|---|---|---|---|
|  | 7a | 7b | 7c | or 7d |
| 1st set of balls | clearance 0 | preload $-\delta/2$ | preload $-\delta$ | preload $-\delta$ |
| 2nd set of balls | clearance $+\delta/2$ | clearance 0 | preload $-\delta/2$ | preload $-\delta/2$ |

FIGS. 8a to 8d show a screw-nut device on which the screw and the nut have an odd number of threads, in this case three threads I, II, III, with progressive intervals a, a+δ, a+2δ between the consecutive threads.

Figure 8A:
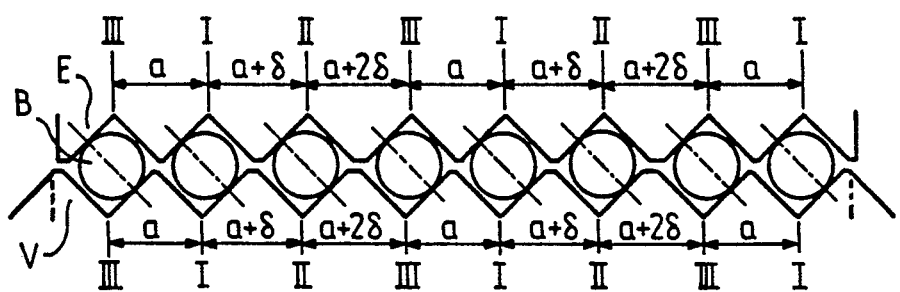
FIGS. 8a to 8d show a fourth embodiment of the invention, with a nut and a screw having three threads and having three progressive intervals between consecutive threads.

When the threads of the same identification of the screw and of the nut are in phase, as shown in FIG. 8a, oblique contacts are obtained of the same orientation for all of the balls B.

In order to obtain contacts opposed in an alternate manner, the screw V is inverted with respect to the nut E.

Figure 8B:
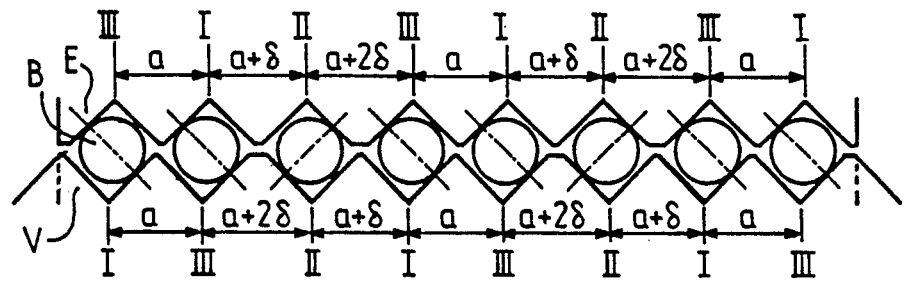
Figure 8C:
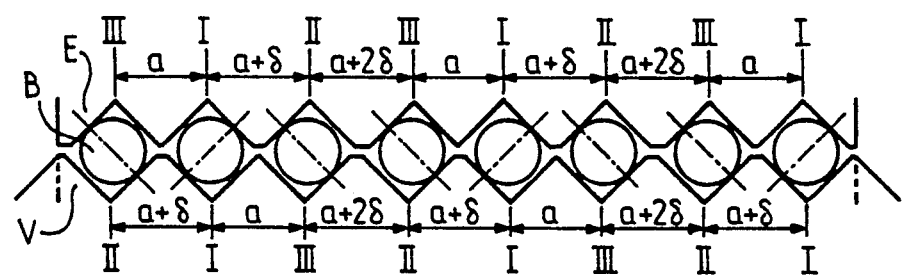
Figure 8D:
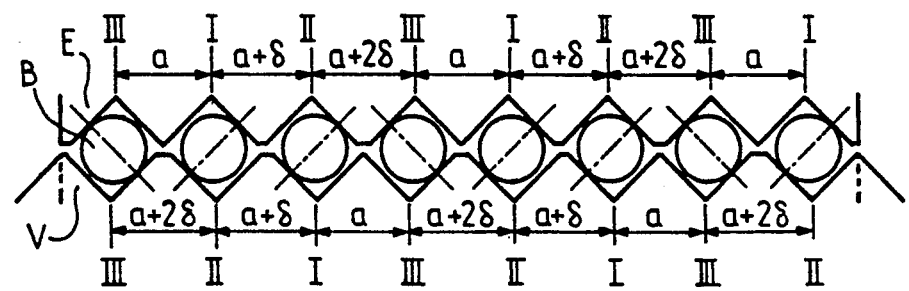

Assuming that the screw-nut device comprises a zero clearance, in the case of FIG. 8a, it is possible, after inverting the screw round with respect to the nut, to obtain for example a preload −δ/2 in the case of dephasing as shown in FIG. 8b or as shown in FIG. 8c, or a preload −δ in the case of dephasing as shown in FIG. 8d, with, each time, a preponderance of the oblique contacts in one direction.

Of course the embodiments described above and shown in the accompanying drawings have been given solely as indicative and nonlimitative examples and many modifications and variants are possible in the context of the invention, with respect both to the number of threads and to the number of the various values of the intervals between consecutive threads. In all cases, the threads on the screw and on the nut are executed so that when the threads of the screw and of the nut are in phase, all of the rolling elements have oblique contacts of the same orientation with the threads of the screw and of the nut, whereas by dephasing of the threads of the screw with respect to the nut or by turning the screw round in the nut, contacts of directions opposed in an alternate manner are obtained.

I claim:

1. Screw-nut device permitting the construction of an assembly with clearance, without clearance or with internal preload, said device comprising a screw and a nut with multiple threads of identical pitch and rolling elements disposed between the threads of the screw and of the nut, wherein the multiple threads on the screw and on the nut have intervals varying in repetitive manner with a periodicity corresponding to the pitch such that the position of the screw with respect to the nut varies the conditions of contact of the rolling elements with the threads of the screw and of the nut in such a manner that the rolling elements have oblique contacts all in the same direction in one position of the screw with respect to the nut and have alternately opposed oblique contacts in another position of the screw with respect to the nut.

2. Device according to claim 1, wherein the screw and the nut have an even number of threads and the intervals between threads have two different values repeated in alternate manner.

3. Device according to claim 1, wherein the screw and the nut have an odd number of threads and the intervals between threads have two different values.

4. Device according to claim 1, wherein the screw and the nut have an even number of threads and the intervals between consecutive threads vary in progressive manner.

5. Device according to claim 1, wherein the screw and the nut have an odd number of threads and the intervals between consecutive threads vary in progressive manner.

6. Device according to claim 5, with an odd number of threads, wherein the number of the oblique contacts in one direction is higher than the number of the oblique contacts in the opposite direction.

7. Device according to claim 1, wherein changing of position is effected by dephasing the threads of the screw with respect to the threads of the nut.

8. Device according to claim 1, wherein changing of position is effected by inverting the screw with respect to the nut.

* * * * *